US009885326B2

(12) United States Patent
Pavlov

(10) Patent No.: US 9,885,326 B2
(45) Date of Patent: Feb. 6, 2018

(54) SECONDARY FUEL INJECTION SYSTEM AND METHOD FOR DIESEL ENGINES

(71) Applicant: MICHIGAN ANGEL FUND LLC, Ann Arbor, MI (US)

(72) Inventor: Kevin J. Pavlov, Livonia, MI (US)

(73) Assignee: Eco-Fueling, Inc., Saline, MI (US)

( * ) Notice: Subject to any disclaimer, the term of this patent is extended or adjusted under 35 U.S.C. 154(b) by 137 days.

(21) Appl. No.: 14/718,958

(22) Filed: May 21, 2015

(65) Prior Publication Data

US 2016/0341144 A1 Nov. 24, 2016

(51) Int. Cl.
*F02D 41/00* (2006.01)
*F02M 35/10* (2006.01)
*F02D 41/06* (2006.01)
*F02D 19/06* (2006.01)

(52) U.S. Cl.
CPC ..... *F02M 35/1038* (2013.01); *F02D 19/0655* (2013.01); *F02D 41/0025* (2013.01); *F02D 41/062* (2013.01); *F02D 41/068* (2013.01); *F02M 35/10177* (2013.01); *F02M 35/10216* (2013.01); *F02D 2200/0406* (2013.01); *F02D 2200/0614* (2013.01); *F02D 2250/18* (2013.01); *Y02T 10/36* (2013.01)

(58) Field of Classification Search
CPC .. F02D 41/263; F02D 41/0025; F02D 19/081; F02D 19/0647; F02D 19/0689; F02D 19/0692; F02D 19/084; F02D 19/0665; F02D 19/0671; F02D 19/061; F02D 19/0655; F02D 19/0694; F02D 19/08; F02M 35/10216; F02M 35/1038; Y02T 10/36

USPC ............................ 123/575, 576, 577, 578
See application file for complete search history.

(56) References Cited

U.S. PATENT DOCUMENTS

| | | |
|---|---|---|
| 4,424,676 A | 1/1984 | Meiners |
| 4,553,504 A | 11/1985 | Duggal et al. |
| 4,958,598 A | 9/1990 | Fosseen |
| 6,959,693 B2 | 11/2005 | Oda |
| 7,066,155 B2 | 6/2006 | Uhde et al. |
| 7,225,763 B2 | 6/2007 | Ritter et al. |
| 8,463,528 B2 | 6/2013 | Cologna |

(Continued)

FOREIGN PATENT DOCUMENTS

| | | |
|---|---|---|
| WO | 2006037155 A2 | 4/2006 |
| WO | 2014081802 A1 | 5/2014 |

*Primary Examiner* — Sizo Vilakazi
(74) *Attorney, Agent, or Firm* — Carrier Blackman & Associates, P.C.; Joseph P. Carrier; William D. Blackman

(57) ABSTRACT

A secondary fueling system for a diesel internal combustion engine includes an injector which injects an oxygen-containing secondary fuel into the engine's air intake system, a pump which pumps the secondary fuel to the injector, a sensor which senses pressure in the air intake system, and a secondary fuel controller which receives output signals from the sensor and pump, operator inputs for the engine, and data signals pertaining to operation of the engine from the main engine controller, determines an injection amount of the secondary fuel based thereon, and controls the pump based on the determined injection amount. A position of the injector in the engine's air intake system is distant from the engine's intake valves and is based on the engine's displacement, e.g., it relates to approximately equal to one quarter of the engine's displacement.

11 Claims, 10 Drawing Sheets

(56) References Cited

U.S. PATENT DOCUMENTS

| | | |
|---|---|---|
| 8,590,510 B2 | 11/2013 | Surnilla et al. |
| 2004/0103859 A1 | 6/2004 | Shetley |
| 2007/0131180 A1 | 6/2007 | Roehm |
| 2007/0180824 A1* | 8/2007 | Yamagata ............... F02B 37/04 60/599 |
| 2008/0184976 A1 | 8/2008 | Johnston et al. |
| 2014/0026853 A1 | 1/2014 | Gray et al. |
| 2015/0354492 A1* | 12/2015 | Surnilla ............. F02D 41/0002 123/349 |

* cited by examiner

| TORQUE of Diesel Engine | | | | | | | | | | | |
|---|---|---|---|---|---|---|---|---|---|---|---|
| % | 0.00 | 10.00 | 20.00 | 30.00 | 40.00 | 50.00 | 60.00 | 70.00 | 80.00 | 90.00 | 100.00 |
| 500.00 | 0.00 | 0.00 | 0.00 | 0.00 | 0.00 | 0.00 | 0.00 | 0.00 | 0.00 | 0.00 | 0.00 |
| 750.00 | 0.00 | 0.00 | 0.00 | 0.00 | 0.00 | 0.00 | 0.00 | 0.00 | 0.00 | 0.00 | 0.00 |
| 1000.00 | 0.00 | 9.00 | 9.00 | 10.00 | 10.00 | 10.00 | 10.00 | 10.00 | 10.00 | 9.00 | 2.00 |
| 1250.00 | 0.00 | 9.00 | 10.00 | 12.00 | 12.00 | 12.00 | 12.00 | 12.00 | 10.00 | 9.00 | 2.00 |
| 1500.00 | 0.00 | 9.00 | 10.00 | 12.00 | 12.00 | 12.00 | 12.00 | 12.00 | 10.00 | 9.00 | 2.00 |
| 1750.00 | 0.00 | 9.00 | 9.00 | 10.00 | 10.00 | 10.00 | 10.00 | 10.00 | 10.00 | 9.00 | 0.00 |
| 2000.00 | 0.00 | 3.00 | 6.00 | 6.00 | 6.00 | 6.00 | 6.00 | 6.00 | 10.00 | 9.00 | 0.00 |
| 2250.00 | 0.00 | 0.00 | 0.00 | 0.00 | 0.00 | 0.00 | 0.00 | 0.00 | 0.00 | 0.00 | 0.00 |
| 2500.00 | 0.00 | 0.00 | 0.00 | 0.00 | 0.00 | 0.00 | 0.00 | 0.00 | 0.00 | 0.00 | 0.00 |

Rows of this chart represent Engine RPM
Please note that the RPM range varies with
different engines and displacement

FIG. 9

SECONDARY FUEL INJECTION SYSTEM AND METHOD FOR DIESEL ENGINES

BACKGROUND OF THE INVENTION

Field of the Invention

The present invention relates to a secondary fuel injection system and method for diesel engines which increases power/torque output of the diesel engines per unit of fuel across the widest possible range of engine operating conditions, and which correspondingly achieves other related benefits, including reductions in fuel consumption, reductions in undesirable engine emissions, and extended engine life. More particularly, the present invention pertains to such a secondary fuel injection system and method which achieves a substantial increase in power output of a diesel engine per unit of fuel across the widest possible range of engine operating conditions by supplementing diesel fuel that is directly injected into the engine cylinders with one or more oxygen-containing secondary fuels, such as ethanol or E85, that is/are drawn into the cylinders with air via the engine's intake system so as to achieve more complete combustion of all fuels within the cylinders. Additionally, the system and method can be implemented efficiently and economically with a minimal number of parts and closed-loop control using data pertaining to engine operations, operations of a vehicle or other machine on which the engine is installed (chassis and other system sensors), and the like, which is available from standard sensors provided with the engines and with the vehicles or other machines.

Description of the Background Art

There are many known systems and methods involving use of secondary fuel(s) for improving performance of diesel engines. These include U.S. Pat. No. 4,424,676 (Meiners), U.S. Pat. No. 4,553,504 (Duggal et al.) U.S. Pat. No. 4,958,598 (Fosseen), U.S. Pat. No. 4,876,988 (Paul et al.), U.S. Pat. No. 7,225,763 (Ritter et al.), U.S. Pat. Nos. 7,284,506 and 7,409,926 (Sun et al.), U.S. Pat. No. 7,921,833 (Bidner et al.), U.S. Pat. No. 8,616,177 (Reitz), US Published Application No. 2004/0103859 A1 (Shetley), US Published Application No. 2007/0131180 A1 (Roehm), and US Published Application No. 2014/0026853 A1 (Gray et al.).

While such other known systems and methods disclose various considerations which may be important for achieving desired operational performance from a diesel engine through use of secondary fuel(s), as well as various theories relating to such considerations, none of the known systems and methods are capable of achieving a significant increase in power output of a diesel engine per unit of fuel across a wide range of engine operating conditions. Further, the known systems and methods often require special equipment, sensors, complex operations, etc., making them unduly expensive and/or complex.

Thus, while there are known systems and methods involving use of secondary fuel(s) for diesel engines, there remains a need in the art for achieving increased power/torque across the widest possible range of engine operating conditions, and which can be implemented efficiently and economically. It is an object of the present invention to fill such need.

SUMMARY OF THE INVENTION

According to a first aspect of the present invention there is provided a secondary fueling system for a diesel internal combustion engine having a direct injection system for diesel fuel, an air intake system, and a main engine controller, comprising: an injector which injects an oxygen-containing secondary fuel into the air intake system; a pump which pumps the secondary fuel to the injector; a sensor which senses pressure in the air intake system; and a programmed controller which receives output signals from the sensor and pump, operator inputs for the engine, and data signals pertaining to operation of the engine, and optionally pertaining to operations of a vehicle or other machine on which the engine is installed, from the main engine controller, and controls the pump and injector based thereon, wherein a position of the injector in the engine's air intake system is distant from the engine's intake valves and is based on the engine's displacement.

According to a second aspect of the present invention, in addition to the first aspect, wherein a volume of air in the engine's air intake system between the position of the injector and the engine's intake valves is approximately equal to one quarter of the engine's displacement.

With such secondary fueling system according to the first and second aspects of the invention, the injector position assures that a significantly more complete combustion of the diesel fuel and secondary fuel(s) in the engine's cylinders is achieved in comparison to combustion of only diesel fuel, which corresponds to a significantly greater power output per unit of fuel, and also results in a significant reduction in undesirable emissions from the engine. Particularly, the position of the injector for the secondary fuel is critical for assuring that the secondary fuel will be completely vaporized/atomized and form a homogeneous mixture with air by the time the injected secondary fuel reaches the intake valves and the mixture is drawn into the engine's cylinders through the intake valves. When the homogeneous mixture is subsequently compressed in the cylinders, it uniformly surrounds and mixes with the diesel fuel that is directly injected into the cylinders, thereby delaying compression ignition of the diesel fuel in a controlled, predictable manner, and such that a significantly more complete combustion of the diesel fuel and secondary fuel(s) in the engine's cylinders is achieved in comparison to combustion of only diesel fuel. The enhanced control/predictability relates to the fact that the cetane level of the diesel fuel is optimally changed using the homogeneous mixture containing the fully atomized/vaporized secondary fuel. Additionally, the complete vaporization of the secondary fuel also cools the intake air by a maximum amount for any given amount of secondary fuel being injected, whereby the density of the air/fuel mixture drawn into the engine's cylinder's is favorably increased.

According to a third aspect of the present invention, the controller is programmed to control the pump and injector in both a torque control mode in which the engine achieves a desired torque output using a reduced amount of diesel fuel and a power control mode in which the engine achieves a greater power output than the engine could achieve using only diesel fuel, but not simultaneously.

According to a fourth aspect of the present invention, in addition to the third aspect, the controller selectively shifts between the torque control mode and the power control mode based on operator inputs for the engine, and data signals pertaining to operation of the engine and pertaining to operations of a vehicle or other machine on which the engine is installed.

With such secondary fueling system according to the third and fourth aspects of the invention, the system may selectively be used to reduce diesel fuel consumption through injection of the secondary fuel when this is a priority for any given application of the system, and similarly may selectively be used to provide more power output than the engine could achieve without injection of the secondary fuel when this is a priority for the system, and the system may selectively switch between the these modes based on the inputs to the controller if this is determined necessary based on inputs to the controller.

Further areas of applicability of the present invention will become apparent from the detailed description provided hereinafter. It should be understood that the detailed description and specific exemplary examples, while indicating the present embodiments of the invention, are intended for purposes of illustration only and are not intended to limit the scope of the invention.

BRIEF DESCRIPTION OF THE DRAWINGS

FIG. 9 is a chart showing secondary fuel injection rate according to an embodiment of the present invention as a % volume of secondary fuel to be injected based on 100% volume of diesel fuel being directly injected in the engine cylinders using engine RPM and Torque output as input variables.

DETAILED DESCRIPTION OF THE PRESENT ILLUSTRATIVE EMBODIMENTS

Figure 1:
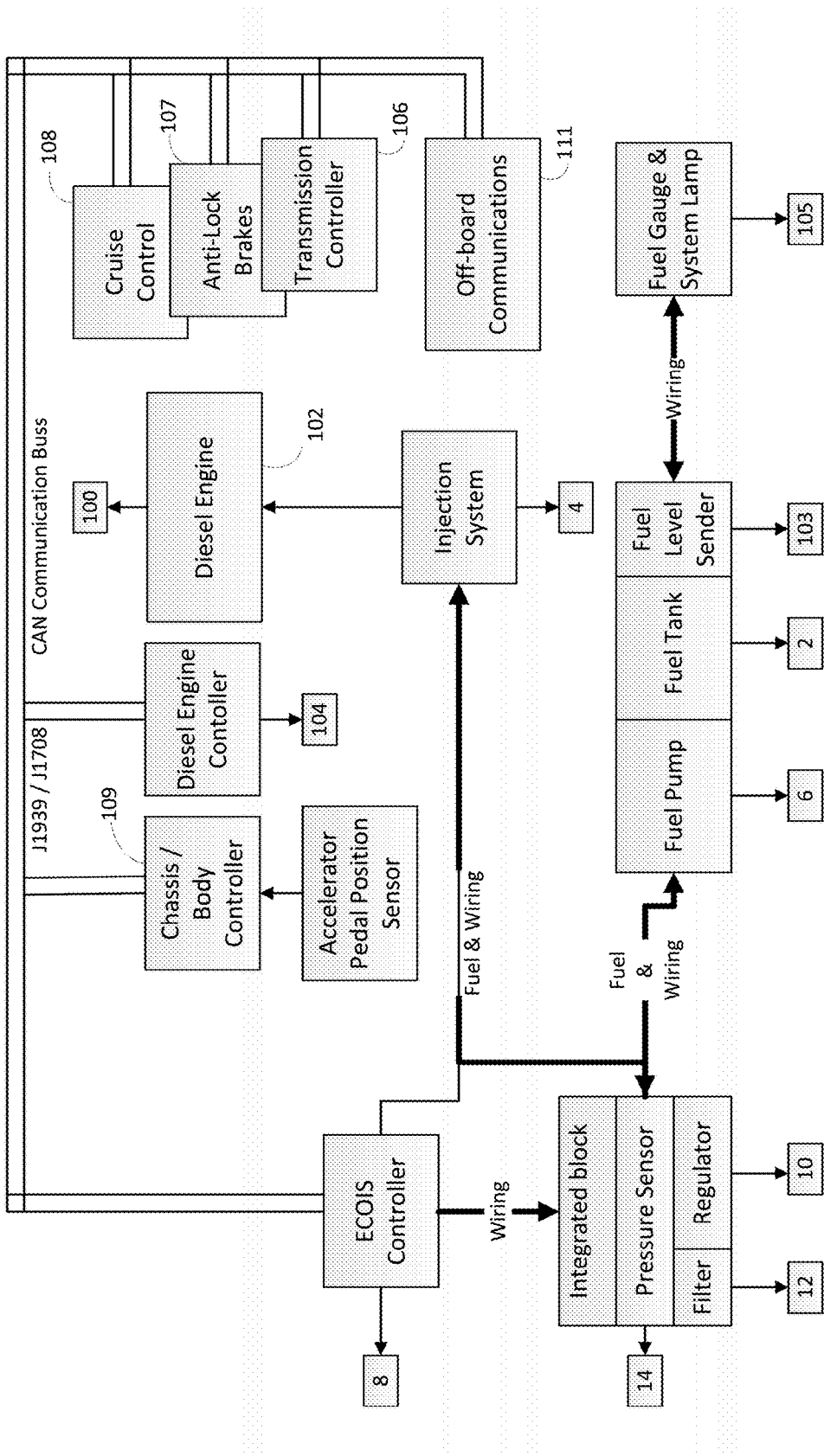
FIG. 1 is a general schematic view of a secondary fueling system for a diesel internal combustion engine according to an illustrative embodiment of the present invention.
Figure 2:
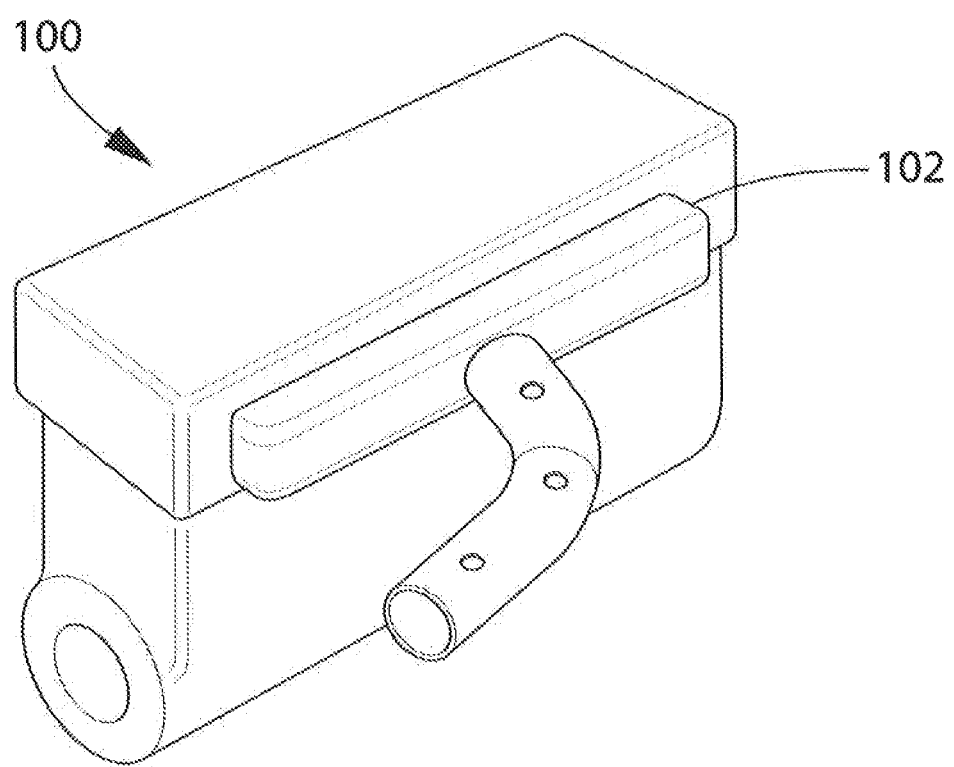
FIG. 2 is a perspective view of a diesel engine having an injector for secondary fuel installed in the engine's air intake according to the present invention.

In the following will be discussed some general considerations underlying the present invention, as well as critical factors discovered by the present inventor, and a number of selected illustrative embodiments of the invention will be described in some detail, with reference to the drawings. It should be understood that only structures considered necessary for clarifying the present invention are described herein. Other conventional structures, and those of ancillary and auxiliary components of the system, are known and understood by those skilled in the art.

General Considerations Underlying the Present Invention

Generally, a secondary fuel injection system and method according to the present invention injects an oxygen-containing secondary fuel such as ethanol or E85 into the engine's air intake so that it is drawn into the engine's cylinders causes a diesel engine to create more power/torque per unit of fuel than it would if it burned only diesel fuel under the same operating conditions. For such systems it has been recognized that the secondary fuel has a much lower cetane rating and much higher octane rating than the diesel fuel, and by injecting the secondary fuel such that it becomes mixed with the diesel fuel and air in the engine's cylinders this dilutes the cetane level of the diesel fuel and will delay the compression ignition of the diesel fuel in the cylinders and allow for more complete combustion of the fuel mixture in comparison to diesel fuel alone. The gains come from several physical phenomenon.

Cooling of the Intake Air Stream.

This is accomplished when the secondary fuel such as ethanol or E85 injected into the engine's air intake system as a liquid becomes vaporized. The phase change of the liquid fuel to gas requires a certain amount of heat, i.e., the latent heat of vaporization of the fuel, which is absorbed from the intake air, thereby cooling the intake air. Such cooling of the intake air increases the density of the intake air, which is desirable for achieving a more complete combustion of the fuel and a reduction of undesirable emissions.

Chemical Reactivity of the Secondary Fuel.

Secondary fuels such as ethanol or E85 not only have significantly different cetane and octane levels than diesel fuel, but also are oxygenated fuels, e.g., containing oxygen in the form of OH groups. In theory, a stoichiometric mixture of diesel fuel and air has just enough oxygen to completely burn the available fuel. In practice this is never quite achieved due primarily to the very short time available in a diesel internal combustion engine for each combustion cycle. Most of the combustion process inside each cylinder or combustion chamber completes in approximately 5-50 milliseconds. Higher oxygenation based on the oxygen content of the secondary fuel will affect the burn of the combined fuels in the cylinder, producing a more complete burn than with diesel fuel only.

However, the known systems and methods are not capable of achieving a significant increase in power output of a diesel engine per unit of fuel across a wide range of engine operating conditions and often require special equipment, sensors, complex operations, etc., making them unduly expensive and/or complex.

In light of this, the present inventor has carefully studied the matter and has discovered certain critical factors pertaining to such a system and method, including that control of the fumigated mixture of air and secondary fuel, along with the correct ratio of secondary fuel to diesel fuel injected is critical to this portion of performance, and that the location of injector(s) for the secondary fuel in the engine's air intake system must not be close to the intake valves of the engine, but instead must be at a position which is distant from the engine's intake valves and based on the engine's displacement in order to achieve as complete combustion as possible of the diesel fuel and secondary fuel(s) in the engine's cylinders. Moreover, the present inventor has discovered that by satisfying these critical factors, it is possible to easily and efficiently implement such a secondary fuel injection system/method which increases power/torque output of the diesel engines per unit of fuel across the widest possible range of engine operating conditions, while achieving unexpectedly good increases in power output per unit of fuel and correspondingly good reductions in undesirable emissions. For example, in actual use secondary fuel injection systems according to the present invention have produced repeatable 20%-30% power gains and emission reductions of CO and NOx of up to 80% in diesel engines in comparison to when the engines use only diesel fuel.

Positioning of Injector(s) For Secondary Fuel

Again, a primary discovery by the present inventor is that the position of the injector(s) for the secondary fuel into the engine's air intake system is critical for achieving a consistent and controlled delay in the combustion ignition of the diesel fuel in the engine's cylinders, as well as a more complete combustion of both fuels in the engine's cylinders once the compression ignition is initiated. Particularly, the present inventor has discovered that an optimum position of the injector(s) for the secondary fuel in the engine's air intake system can be established by a volume calculation based on two equations or algorithms respectively relating to: the amount of delay in the compression ignition of the diesel fuel induced by the secondary fuel; and the amount of work which can be derived from combusting the mixture of diesel fuel and the secondary fuel(s). As it turns out, the position of the injector(s) cannot be closely adjacent to the engine's intake valves, but relatively distant from the engine's intake valves and such that a volume of air in the engine's air intake system between the position of the injector(s) and the engine's intake valves is approximately equal to one quarter of the engine's total displacement. By such positioning of the injector(s), it is assured that the injected secondary fuel will be essentially, completely vaporized/atomized and thoroughly mixed with the air which passes through the air intake system, and will be in the form of a homogeneous mixture with the air by the time the injected secondary fuel reaches the intake valves and the mixture is drawn into the engine's cylinders through the intake valves. Such a homogenous charge will consistently and reliably create the desired changes to the cetane level of the subsequent diesel fuel being injected into the engine's cylinders, which leads to the desired delay in compression combustion of the diesel fuel, as well as to a more complete burn of both fuels in the engine's cylinders. The more complete the conversion of the secondary fuel into a vaporized state and homogeneously mixed with the intake air prior to injection into the cylinder, the longer the delay of combustion ignition, which is the desired effect under load on the engine. The total delay will be a factor of the percent of secondary fuel to diesel up to the point of saturation, whereas the saturation point is dependent on the cylinder pressure which depends on total intake density and pressure prior to introduction into the cylinder. Density is affected by ambient air temperature and any temperature modification and compensation of the intake air by the engine and associated components.

In the combustion cycle, if the secondary fuel is completely vaporized/atomized and in a homogenous mixture with the intake air when it is drawn into the engine's cylinders, the homogeneous mixture will be compressed in the cylinders and the diesel fuel is directly injected into the compressed mixture in the cylinders whereby the compressed mixture essentially completely surrounds and mixes with the diesel fuel thereby reducing the cetane level of the diesel fuel in a predictable/controllable manner, which shifts the compression ignition timing of the entire mixture toward an optimum crank angle timing, such as 1°-5° before top dead center (TDC). By this, essentially none of the diesel fuel is ignited before the optimum crank angle. Conversely, when a diesel engine is burning only diesel fuel it is very common for some of diesel fuel to be ignited prior to the optimum crank angle, which manifests in itself in engine knocking. Because essentially none of diesel fuel is ignited prematurely in the system and method of the present invention, no ignition gasses are generated prematurely and this permits the entire fuel mixture to be further smoothly compressed until the optimum crank angle is reached.

Further, once the compressed mixture reaches the optimum crank angle and compression ignition begins, the presence of the oxygen-containing secondary fuel in the compressed mixture causes the entire mixture to burn more quickly, more uniformly, and more completely in comparison to a compressed mixture containing only diesel fuel and air. For example, a diesel engine burning diesel fuel only may achieve about 70% combustion of the fuel in the engine's cylinders, whereas with the system/method of the present invention the combustion rate of the combined fuel mixture may be increased to 80-85%. This is due to multiple factors, including that the secondary fuel has a higher octane level than diesel fuel and that the secondary fuel contains oxygen, as well as that injection of the secondary fuel into the engine's air intake system the secondary fuel has a cooling effect of on the intake air as discussed above, which increases the density of the intake charge, creating additional combustion efficiency, and further reducing undesirable emissions. For example, since a greater percentage of the combined fuels is burned in the engine's cylinders as compared to the percentage of diesel fuel alone that would be burned in the same engine's cylinders, the exhaust temperature is lower than when diesel fuel alone is burned.

Diesel engines will have a fixed volume of intake area within the engine. Additionally, there is usually an intake plenum bolted to the head of the diesel engine that has a volume. Finally, there normally exists in most diesel engines intake tubing or piping that extends between an intercooler and the intake plenum, noting that most diesel engines today have a turbocharger and an associated intercooler which cools the intake air which has been heated by the turbocharger. Based on the inventor's findings, the volume of air between the intake valve (in the cylinder head) and the point at which the injector is mounted in the air intake system should be proportional to the total volume of air that is swept into the cylinder when the piston travels from Top Dead Center (TDC) to its lowest point of Bottom Dead Center (BDC) or whenever the intake valve closes stopping the air supply into the cylinder during the intake stroke, and that a critical relationship for power increase under load can be determined based on two equations or algorithms.

The Two Equations

The first equation (1) below involves calculation of the amount of delay $\tau$ (delay model) in compression combustion of the diesel fuel that is caused by the homogeneous mixture of secondary fuel and air introduced into the engine cylinders, which relates to compression ignition or self-ignition temperature of the fuel mixture in the engine's cylinders, and is defined as the ratio of the mass of the stoichiometric amount of air required for the combustion of the diesel fuel and the secondary fuel(s) to the mass of the actual amount of air $\varphi$ drawn into the cylinder or combustion chamber.

$$\tau = 4.3 \times 10^{-3} \times P \times 10^{-a} \times \varphi \times 10^{-b} \times \exp^{c/T} \qquad (1),$$

in which a, b, c are kinematic time constants. For equation (1) certain assumptions have been made in order to simplify the equation, including that all components of the combustion mixture of fuels and air are considered to behave as ideal gasses and comply with Boyle's Law. Solving equation (1) for τ with respect to time, when the value of τ≥1.0 the compression ignition of the mixture will begin. Again, the optimum crank angle for the compression ignition of the mixture is as close to TDC as possible, e.g., as 1°-5° before TDC.

The second equation (2) below involves estimation of the amount of work derived from combustion of the overall mixture of diesel fuel, secondary fuel(s), and air in the engine's cylinders, which pertains to how completely the fuel mixture is combusted. This involves piston displacement ρ, which is a known function of time, hence the density-time is also known in terms of the mass content of the cylinder $\rho(\theta)=M/V(\theta)$, where θ is crank angle for the piston. The net rate of production of each fuel will be a function of the rate of all reaction steps involved that are proceeding simultaneously and given by the equation:

$$-\rho(dxi/dt)=\Sigma J=1 \text{ to } \theta(\Delta P\alpha ij)(\Delta PRj) \quad (2)$$

where i, j are counters, ΔPα is the pressure change in the cylinder caused by combustion of the secondary fuel(s), and ΔPR is the pressure change in the cylinder caused by combustion of the diesel fuel. The counter i is a model following counter based on a preset number n of cycles of control operation for the injection of the secondary fuel(s) discussed below in relation to FIGS. 3-4, while the counter j is based on the crank angle θ. By the equation (2) the goal is to maximize cylinder pressure after TDC because this will directly correlate to increased fuel combustion in the cylinder and increased output from a given amount of fuel.

Again, based on the inventor's actual testing, the critical volume established by these two equations generally equates to approximately one quarter of the total displacement of the engine for most diesel engines. For example: for a 10 liter diesel engine, 2.5 liters of intake volume used to mix the secondary fuel with air based on placement of the injector will promote a higher power/efficiency increase than a lower volume or a higher volume of intake volume.

The exact amount may vary somewhat with the size of the engine displacement. For example, smaller displacement engines tend to run at higher RPM, which in turn causes the engine to generally run at higher temperatures, and for air to generally move at higher velocity through the intake system, and based on these factors smaller displacement engines tend to have a peak torque curve that will manifest at a higher RPM range than larger displacement engines. Correspondingly, the ideal location for the injector may correspond to slightly more than one quarter the total displacement of the engine. On the other hand, for larger displacement engines the ideal location for the injector may correspond to slightly less than one quarter the total displacement of the engine. For most diesel engines, the injector position will be downstream of the inter-cooler, and an exhaust gas recirculation (EGR) tube which feeds exhaust gasses into the air intake system for reducing emissions.

Of course, other practical factors may affect the positioning of the injector such that it is cannot be disposed exactly at the optimum location. For example, some governing factors are related to restrictions in the airflow should be taken into consideration, such as a venturi typically used on diesel engines for mixing recirculated exhaust gasses (EGR), an intake heater used to pre-heat the engine air, temperature and pressure sensors located downstream of the injection point, etc. It is important not to inject the mixture on temperature or pressure sensors as this may skew sensed conditions for the diesel engine controller. Re-location of sensors and pre-heaters should be considered, but this may not be practical for some applications. Additionally, air-brake feed tubes should not be located down stream of the secondary fuel injection because oxygen-containing secondary fuels such as ethanol and E85 may detrimentally affect parts of the air-brake system, including diaphragms.

Distinct Torque Control Mode and Power Control Mode of the Base Engine

An important aspect of the present invention is that the system and method can be effectively used for injecting the secondary fuel under the widest possible range of engine operating conditions. With such objective in mind, a second factor discovered by the present inventor is that for determining the optimum amount of secondary fuel to inject into the air intake system relative to the amount of diesel fuel being directly injected into the engine cylinders at any given time and for the full range of engine operating conditions, it may be advantageous to effect two different types of control depending on what the desired objective is. If the desired objective is to have a more efficient engine that burns less diesel fuel, and correspondingly reduces undesirable emissions, then it would be more appropriate to apply a torque control mode in which the secondary fuel is injected in an amount such that the engine optimally achieves a desired torque output using a reduced amount of diesel fuel. As discussed above, this may be achieved because the system of the present invention causes the overall fuel mixture to burn more completely than if only diesel fuel is being burned, thereby deriving greater output and less harmful emissions for a given quantity of fuel. On the other hand, if the desired objective is to achieve an overall larger output from a given engine, e.g., so that it is not necessary to use a larger size engine for a given application, then it would be more appropriate to apply a power control mode in which the secondary fuel is injected in an amount which optimally supplements the amount of diesel fuel being burned to get the higher output from the engine. Conventionally, it is known to increase power output of a given engine using a turbocharger or supercharger to increase air mass flowing into the engine. When the power control mode is used according to the present invention, this can further increase the engine output in addition to any increase achieved through use of a turbocharger or supercharger.

Figure 7:
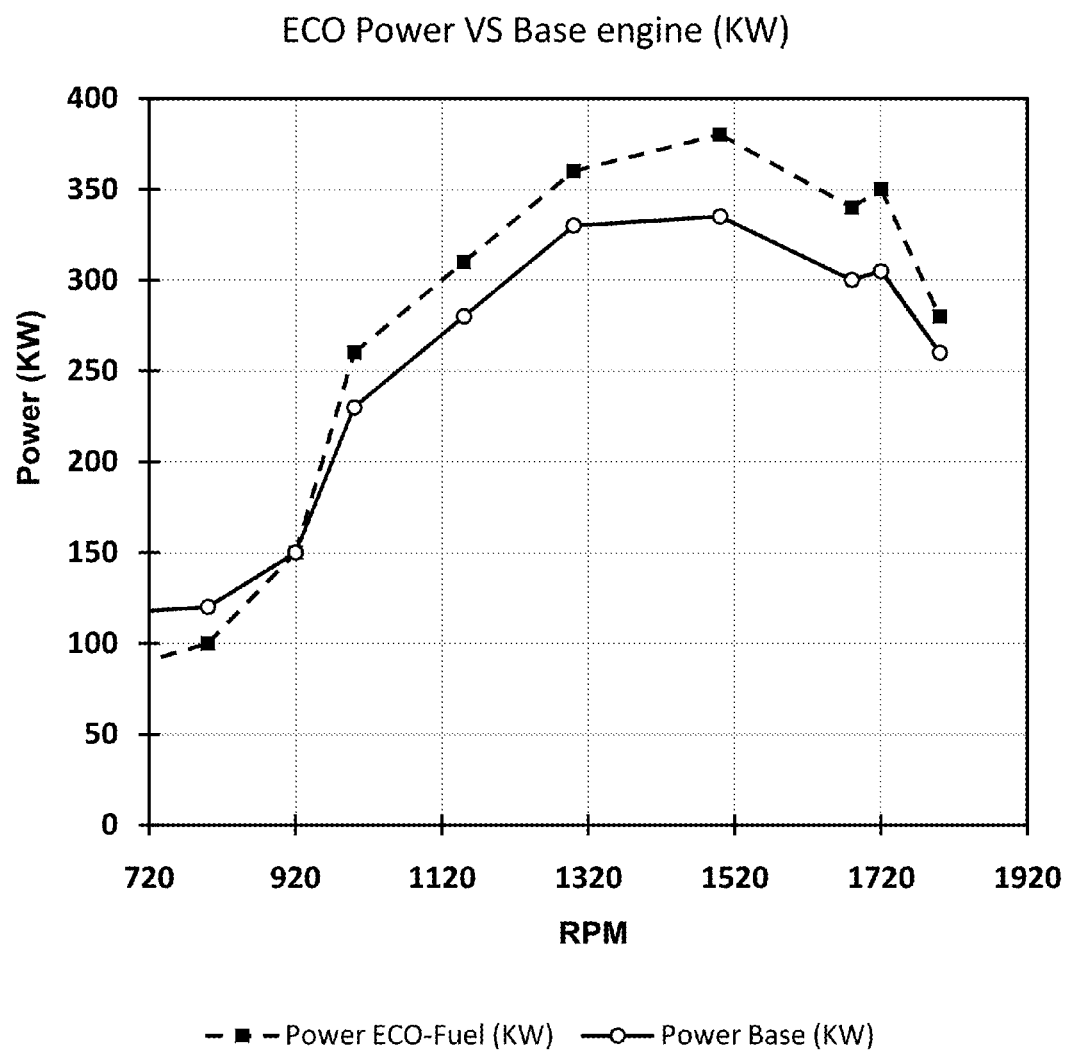
FIG. 7 is chart showing power output v. engine speed for a diesel internal combustion engine using only diesel fuel and the same engine using a secondary fueling system according to an illustrative embodiment of the present invention.
Figure 8:
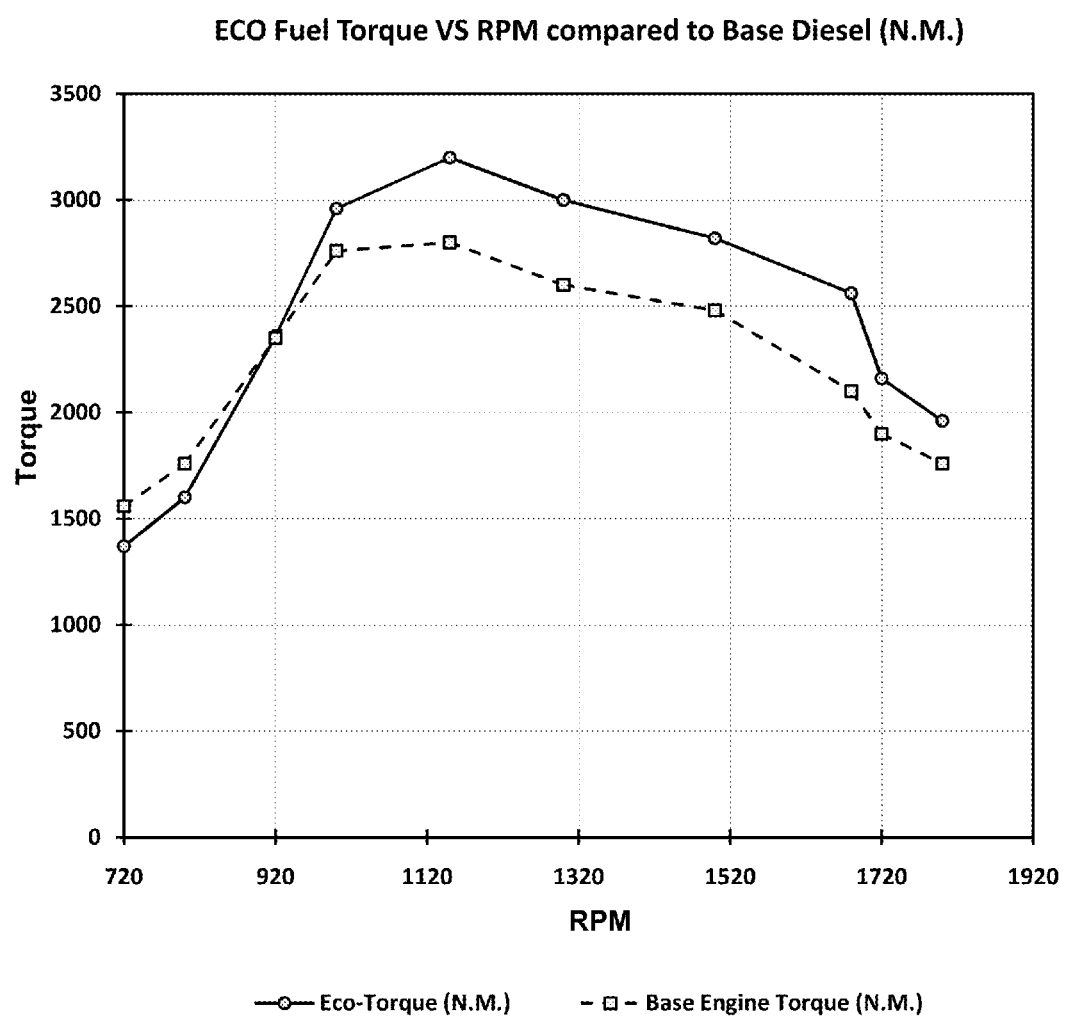
FIG. 8 is chart showing torque output v. engine speed for a diesel internal combustion engine using only diesel fuel and the same engine using a secondary fueling system according to an illustrative embodiment of the present invention.
Figure 10:
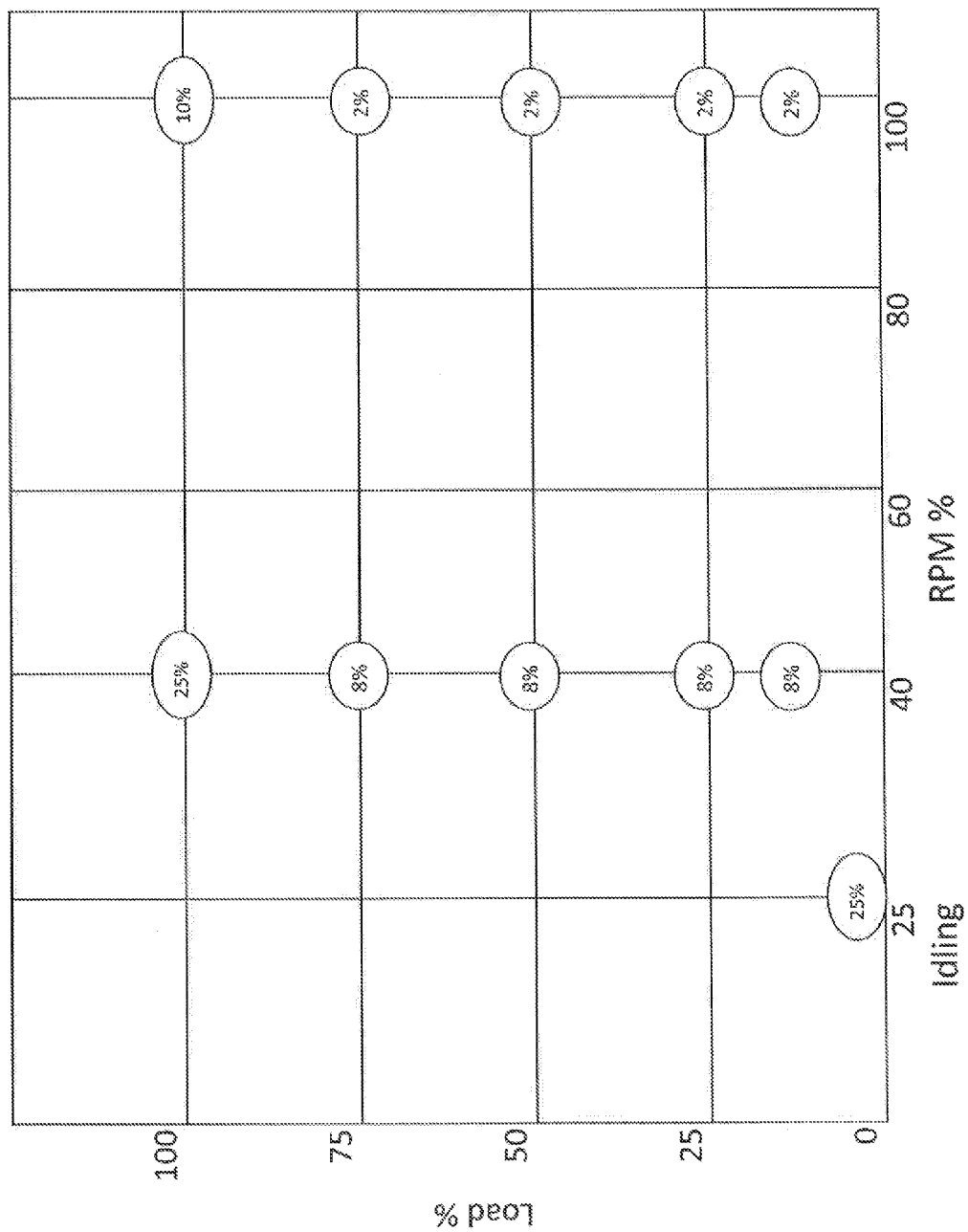
FIG. 10 is another chart showing secondary fuel injection rate according to an embodiment of the present invention as a % volume of secondary fuel to be injected based on 100% volume of diesel fuel being directly injected in the engine cylinders using engine RPM and engine load % as input variables.

Additionally, it may be desirable to shift between torque control mode and power control mode when operating an engine over an extended time period using a system according to the present invention. The output of the diesel engine can be measured in various manners, including power output typically measured in kilowatts (KW) and torque output typically measured in Newton meters (NM). Depending on the particular operating conditions which the engine is experiencing, the engine's output may be better and more accurately reflected in terms of torque output as compared to power output, and vice versa. Compare FIG. 7 (power output v. engine speed) to FIG. 8 (torque output v. engine speed), both of which show the increased output achieved by a diesel engine using a system according to an embodiment of the present invention in comparison to operation of the engine burning diesel fuel alone at the same engine speeds. Although both FIGS. 7 and 8 show the increased output, the torque output is more clearly reflective of the increased output than is the power output. For example, if the engine is running under a high load at steady state, e.g., if a vehicle on which the engine is installed is traveling on a flat stretch of highway carrying a heavy load, shifting to control of the secondary fuel injection based on the torque control mode of the base engine will help it run at a more efficient point thus creating a more efficient engine with lower emissions. Typically, on a vehicle cruise control is used to maintain a vehicle speed. With the present invention operating in torque control mode, the torque may be changed to maintain the vehicle speed. On the other hand, if a vehicle on which the engine is installed is traveling on a long uphill stretch of a highway carrying a heavy load, shifting control of the secondary fuel injection based on the power control mode of the base engine will help assure that vehicle can reliably traverse the uphill stretch at an appropriate speed. Power required to maintain speed on the uphill grade is calculated and if the base engine cannot achieve the necessary output, the amount of secondary fuel being injected by the system is adjusted/increased so as to achieve the necessary power output.

Temperature Compensation A third factor discovered by the present inventor is that it is necessary to provide for temperature compensation in the control algorithm for injection of the secondary fuel given that the diesel engines may be used under a wide variety of ambient conditions, including cold temperature conditions. This can be effected by modifying the base control algorithm using a temperature compensation algorithm or temperature compensation table which may create or store proportionality factor(s) that is/are multiplied by the target percent secondary fuel in order to optimize the secondary fuel delivery amount when the ambient temperature falls below certain level(s), e.g., a first factor may be used when the ambient temperature falls below 0° F., a second factor may be used when the ambient temperature falls below −10° F., and a third factor may be used when the ambient temperature falls below −20° F. Large temperature swings in the range of 32° F. to less than −20° F. happens frequently when a truck equipped with a diesel engine travels over mountains, for example, and the temperature compensation according to the present invention is very beneficial in such situations. Further, diesel fuel is made in different formulations based on the ambient temperature in the environment in which the engine is used, e.g., summer blend and winter blend, and/or based on the region in which the diesel fuel is being sold. Again, the base control algorithm using a temperature compensation algorithm or temperature compensation table which accounts for these considerations.

Topology Considerations

A fourth factor discovered by the present inventor is that for diesel engines used as the power plants for vehicles it is important to know where the vehicles are traveling as this may greatly affect how the engines will be expected to perform, and correspondingly how much secondary fuel should be injected to achieve the expected performance over and above base engine performance using only diesel fuel. For example if the vehicle is traveling in a high altitude area or on a long uphill stretch of a highway, the expected performance may be different than if the vehicle is traveling in a low altitude area or on a long downhill stretch of a highway, and the optimum injected amounts of the secondary fuel may be significantly different. Accordingly the control algorithm may be adjusted based on data relating to topology of the vehicle's traveling conditions, which could be obtained from a global position system (GPS), a navigation system provided with or connected to the vehicle, connected vehicle technology (from other vehicles that have traveled the corresponding route recently), etc. Alternatively, topology considerations could be based on how the engine is and has been performing relative to vehicle performance. For example, if the vehicle equipped with the engine as a power plant is traveling in a high altitude area or on a long uphill stretch of a highway, the vehicle may be slowly but steadily losing traveling velocity even though the engine has been running at a generally steady speed or RMP. Based on this the system of the present invention would determine that the vehicle is traveling in a high altitude area or on a long uphill stretch of a highway, and would increase the injection amount of secondary fuel to increase engine output. Information pertaining to topology considerations may be predetermined for the engine and vehicle on which it is installed, and stored in a look up map in the controller's memory.

Other Considerations Based on Use or Vocation

A fifth factor discovered by the present inventor is that for diesel engines used as the power plants for vehicles or other machines, it is important to know just what the vehicle/machine is intended to do. For example, if the vehicle is a garbage truck with a hydraulic system type PTO which drives a trash compactor and or trash bin moving device, it is important to know not only if the vehicle is moving, such that the engine must provide thrust for achieving the desired vehicle speed, but also whether the PTO is being actively driven such that the engine must produce the power required from the PTO whether or not the vehicle is traveling or in idle.

Exemplary Embodiments of the Present Invention

With reference to FIG. 1 there is shown is a general schematic view of a secondary fueling system 1 for a diesel internal combustion engine according to an illustrative embodiment of the present invention. The system generally includes a tank 2 containing a supply of an oxygen-containing secondary fuel such as ethanol or E85, an injector 4 which injects the secondary fuel into an air intake system 102 of a diesel engine 100, a pump 6 and associated components which supply the secondary fuel to the injector 4, including a regulator 10, filter 12, and pressure sensor 14 and a one way valve integrated in the pump, as well as a secondary fuel (SF) controller 8 which controls operations of the pump based on various factors. Such factors include the signal from pressure sensor 14, the level of the secondary fuel obtained from a fuel level sender 103, operating conditions of the engine such as load and RPM which may be obtained from a main engine controller 104, other conditions relating to a vehicle or other machine with which the engine 100 is associated and which may be obtained from other existing controllers such as transmission controller 106, anti-lock brake controller, cruise controller 108, chassis/body controller 109, requests from a person operating the engine such as a driver or of a vehicle on which the engine is installed, including accelerator pedal position obtained from sensor 110, and inputs from off-board communications relating to ambient temperatures and local topology 111 such as GPS, a navigation system, communications from other vehicles travelling in the vicinity on the same route ahead of the vehicle equipped with the engine 100, etc. The SF controller 8 may conveniently obtain all of the necessary information via a CAN control buss such as J1939/J1708 through which the main engine controller 104 and other controllers normally communicate.

The fuel tank 2 may be one that already exists on a vehicle, e.g., many trucks equipped with diesel engines as the power plants thereof have or will soon begin to carry E85 for use as a reductant in their exhaust system for reducing NOx emissions. If E85 is used as the secondary fuel in the system and method of the present invention, then a single tank can be used to conveniently store the E85 for both the exhaust system and the secondary fueling system 1 in FIG.

1. Similarly, the fuel level sender could be standard equipment together with the tank 2.

The injector 4 may be any appropriate injector for the secondary fuel such as a cone injector, and the system may include multiple injectors for the secondary fuel if needed or desired, e.g., if a single injector is not capable of injecting a sufficient amount of the secondary fuel as required by the system. The particular structure of the injector 4 is not so important, although the particular placement of the injector in the engine's intake system 102 is critical as discussed further herein, and the injector should be able to inject the secondary fuel in a substantially atomized state. Also, the particular orientation of the injector is not so critical, as long as the when the secondary fuel is injected into the air intake system it should entirely stay within the air stream passing through the system, and should not directly contact the walls of the system and any other structural components in the system so as to be coated thereon.

The pump 6 and associated components may be appropriately selected based on the type of secondary fuel being used and flow rate of the secondary fuel required for the diesel engine. However, the pump 6 and associated components can be relatively small/compact in size so that they may be easily fitted in conjunction with the engine 100, e.g., on the vehicle on which the engine is installed. For example, in FIG. 1 the pressure sensor 14, filter 12, and regulator 10 are shown integrated in a single block, and similarly the fuel pump 6 is integrally provided with the one way valve.

The SF controller 8 may be an electronic control unit (ECU) which is programmed, e.g., via machine readable media, to execute control of the pump 6, again, based on various factors as discussed above. As indicated in FIG. 1, the SF controller 8 may effect a closed loop feedback control which is largely independent of the engine control being performed by a main engine controller 104, or in other words it runs independently of control algorithms being run/performed by the main engine controller 104. Such closed loop feedback control may be considered as an indirect closed loop feedback control or a model-following control, and is desirably easier to effect than control which is actively tied to control being performed by the main engine controller 104.

Even when the SF controller 8 effects a closed loop feedback control, it may conveniently obtain from the main engine controller 104 other controllers 106-109, 111, and existing sensors already provided with the engine or with a vehicle/machine with which the engine is associated most of the data it requires pertaining to the engine operating conditions, as also shown in FIG. 1, as such data is already being obtained for use by these existing controllers. The SF controller 8 may similarly obtain data pertaining to the state of a vehicle on which the engine is mounted from a communication bus of the vehicle, including cruise control data, PTO control data, anti-lock braking system (ABS) data, transmission control data, data from a person operating the engine such as operations of accelerator and bake pedals, ambient conditions, etc., and may obtain data relating to topology from a GPS and/or navigation system as discussed above. In this manner, the secondary fueling system 1 of the present invention can be manufactured and installed relatively inexpensively because it has few additional components beyond those already provided in conjunction with a diesel engine and/or those provided with a vehicle or other machine with which the engine is associated.

As discussed above, the system and method according to the present invention may be advantageously used for injecting secondary fuel into the engine's air intake system as a supplement to the diesel fuel being directly injected into the engine's cylinders across the widest possible range of engine operating conditions. In other words, the system and method may be advantageously used to achieve and maintain a proper level of cetane in the fuel mixture being combusted in the engine's cylinders, thereby shifting compression ignition timing toward an optimal crank shaft angle which improves performance in loaded and unloaded conditions across a full RPM range of the engine. Operational states of interest are as follows, but are not limited to the following for a diesel engine provided as the power plant of a vehicle.

Start-up of the power plant and/or additional engines;
Warm-up phase of the engine such that it achieves a minimum operating temperature;
States of operation after warm up
 Idle, e.g., when vehicle is not moving and power take off (PTO) and accessories are either not used or being used at a minimal level,
 Vehicle Stationary operation: PTO and accessories are being used for work, requiring the diesel engine to produce torque that is above its non-loaded idle minimum torque,
 Vehicle mobile operation where the power plant torque is being used to provide thrust force on the vehicle as well as some level of accessory or PTO power, which is appropriate for torque control mode as discussed herein,
 Steady State operation (less than 10% change in torque output over 5 min), which is appropriate for power control mode as discussed herein, and
 Shut-down/Diagnostics/Prognostics.

During engine start-up the secondary fuel may be used to assist the starting process by providing a very rich (20%+) injection of secondary fuel prior to the engine cranking process. The amount of secondary fuel to be injected is based on what type of secondary fuel is being injected. Also, injection of the oxygen-containing secondary fuel according to the present invention could be combined with one or more other secondary fuels for purposes of facilitating engine start up.

For example, it is conventional to use a starting fluid such as diethyl ether to help start internal combustion engines because of its low 160° C. (320° F.) auto-ignition temperature. Some current products sold as starting fluid are mostly volatile hydrocarbons such as heptane, (the main component of natural gasoline) with only a small portion of diethyl ether, and carbon dioxide (as a propellant). It is often useful when starting direct injected diesel engines. Some formulations include butane or propane as both propellant and starting fuel. Diethyl ether should not be confused with petroleum ether (a crude oil distillate consisting mostly of pentane and other alkanes) which has also been used for starting engines. Each of these formulations requires a different fuel to air ratio which is dependent on the type of engine and the amount of fuel required to start the engine.

Starting fluid is conventionally sprayed into the engine intake manifold usually near the air filter to get added fuel to the combustion cylinder quickly. Using starting fluid to get the engine running faster avoids wear to starters and batteries. However, caution is required when using starting fluid with diesel engines that have preheat systems in the intake or glow-plugs installed, as the starting fluid may pre-ignite, leading to engine damage.

According to the present invention, one or more additional fuels such as diethyl ether may be mixed with an oxygen-containing secondary fuel that is injected in the engine's air intake system 102 at an optimum location which assures that the fuels will be completely vaporized and homogeneously mixed with the intake air by the time the mixture reaches the engine's intake valves. A proportional mix utilizing separate injectors for starting fluid and secondary fuel may be used, and this mix ratio could be predetermined and stored as a look up table in a memory of the SF controller 8. Such look up table may have temperature and engine RPM as dependent variables.

During the engine warm-up phase, generally no secondary fuel would be used according to the present invention. Because the secondary fuel improves combustion efficiency of the engine, this would have a cooling effect on the engine, which would undesirably slow the warming of the engine during this phase.

For the operation states of the engine after warm up the system 1 of the present invention will inject varying amounts of the secondary fuel depending on the engine operating conditions, the requests from a person operating the engine, ambient conditions, etc. which, again, may be obtained from the main engine controller 104, and depending on inputs obtained from sensors of the system 1, including the secondary fuel pressure sensor 14. Operation of the system during such operation states is discussed below in relation to FIGS. 3-4. In tests performed by the present inventor the amount of secondary fuel being injected during these operation states of the engine have typically varied in a range of 1%-20% volume of the amount of diesel fuel being directly injected into the engine. For example, an injection amount at the low end of the range may be appropriate under idle operation and an injection amount may be at the high end of the range under steady state operation. During an average complete 10 hour run of an engine used as the power plant of a truck, the injection amount of the secondary fuel may average 10% volume of the amount of diesel fuel being directly injected into the engine.

Fundamental Operation of the Controls

As discussed above, the SF controller 8 may desirably and simply effect a closed loop feedback control which is largely independent of the engine control being performed by a main engine controller 104, but which conveniently uses data pertaining to engine operations which it obtains from the main engine controller 104 and other existing controllers associated with the engine and/or a vehicle or other machine the engine is powering. Additionally, the SF controller 8 may be programmed to function under open loop control, such as under default operation of the engine in the event of system failure or the like, which may involve the following.

First, the open loop control effected by the SF controller 8 may use a default two dimensional base fuel map. The key factors of such a default two dimensional base fuel map are the engine percent load verses the engine RPM. There are numerous base fuel maps used for different engine manufacturers and different engines produced by those manufacturers. In the present invention such base maps would be programmed based on a given user's engine and the application for the engine.

Second, the base map may be made up of factors that represent a secondary fuel injection amount that is based on the volume of diesel fuel being injected. In the event of a fault or other factors that may eliminate the normal closed loop operation effected by the SF controller 8, the base map would be used.

Third, the base two dimensional maps may be modified by a temperature compensation algorithm or temperature compensation table relating to cold weather operation. As discussed above, this may involve proportionality factor(s) that is/are multiplied by the target percent secondary fuel in order to optimize the secondary fuel delivery amount when the ambient temperature falls below certain level(s), e.g., a first factor may be used when the ambient temperature falls below 0° F., a second factor may be used when the ambient temperature falls below −10° F., and a third factor may be used when the ambient temperature falls below −20° F.

The closed loop control effected by the SF controller 8 used the base maps and modified base maps as discussed above, but closes the control loop using data conveniently obtained from the main engine controller 104 as discussed above. Primary data obtained from the main engine controller, and other controllers associated with the engine or with a vehicle or other machines associated with the engine, relating to engine operating conditions may include, in addition to the information of the base maps, exhaust gas temperature, after treatment % $O_2$, after treatment intake NOx, engine actual exhaust oxygen, engine average combustion time, engine exhaust gas oxygen sensor fueling correction, engine exhaust gas pressure, engine power, engine turbo charger speed, engine turbo charger waste gate drive position, exhaust gas mass, particulate trap inlet and differential pressures, etc. Further, because the system 1 according to the present invention may be used for diesel engines which not only provide thrust for propelling a vehicle, but also for PTO operation, which may occur whether or not the engine is providing thrust, the PTO control will typically involve use of additional signals for feedback control.

While the closed loop control effected by the SF controller 8 may be effected in various manners, one desirably simple manner is to control the pump 6, which would be a variable rate pump, using pulse width modulation (PMW) to supply the determined amount of the secondary fuel to the injector 4 based on a constant differential pressure across the injector (s) 4. Basically, the pressure of the secondary fuel is monitored based on the signal from sensor 14 and adjusted depending on the pressure within the air intake system 102 which is being sensed for the main control of the engine 100 by main controller 104, so that there is a constant differential pressure across the injector(s).

Method of Operation

Figure 3:
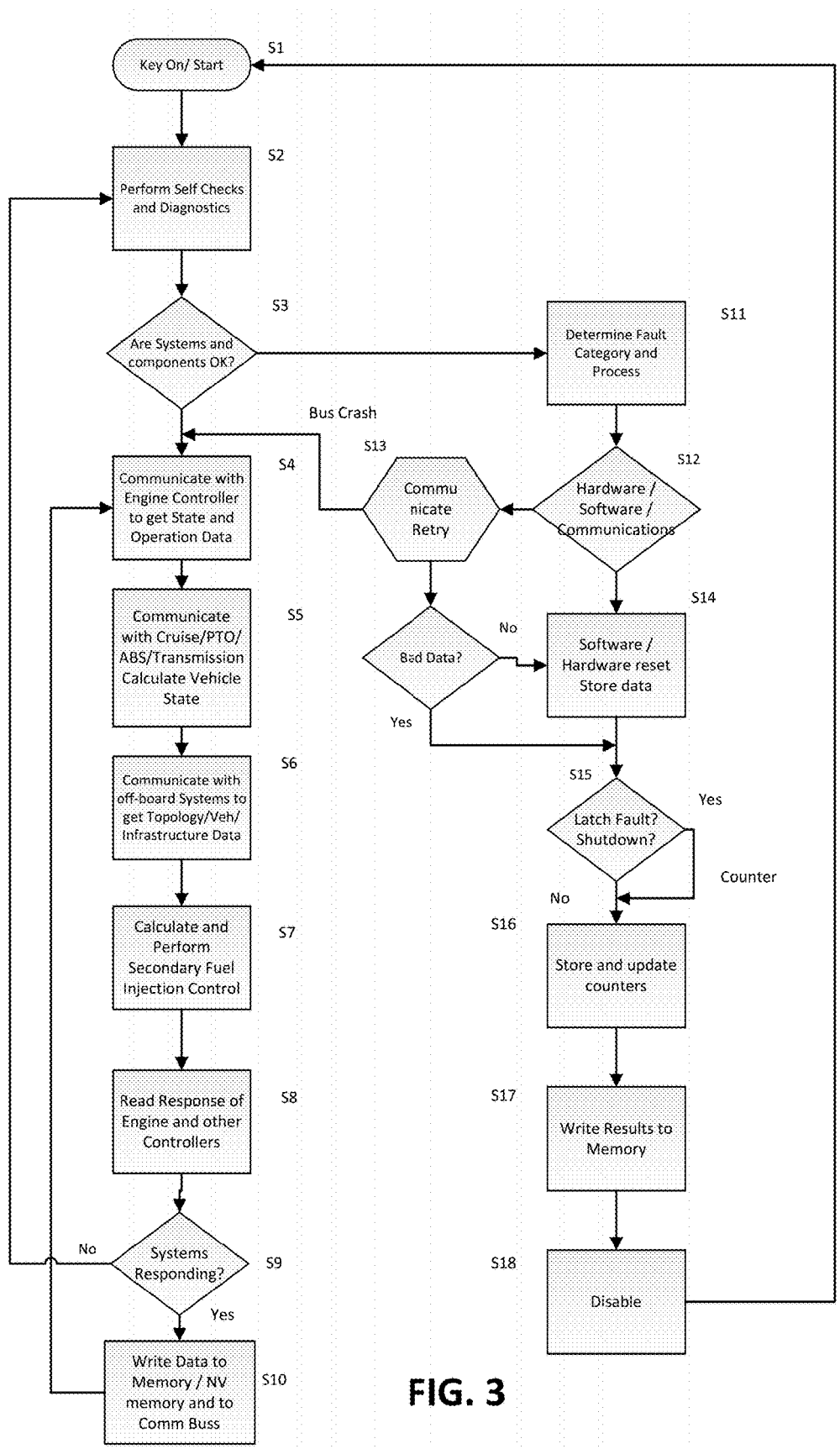
FIG. 3 is a flow chart showing the overall operation of a secondary fueling system for a diesel internal combustion engine according to an illustrative embodiment of the present invention.

An exemplary embodiment of operation of the system 1 will now be discussed with reference to FIG. 3 which shows the overall operation of the system, and FIG. 4 which shows specific control of the secondary fuel injection corresponding to step S7 of FIG. 3. For purposes this operation, the engine 100 has been installed as the power plant of a vehicle such as an eighteen wheeled truck, and the injector(s) for the secondary fuel has/have already been mounted at the appropriate position of the air intake system 102 which has been determined as discussed above. The controls in FIGS. 3-4 may be performed by the SF controller 8 every few milliseconds.

At step S1 the engine 100 is started and at step S2 the SF controller 8 performs self checks to assure that the system 1 is functioning normally. At step S3 control will advance to step S4 if the self checks show that the system is functioning normally, or to step S11 if the system is not functioning normally.

At step S4 the SF controller 8 obtains desired data from main engine controller 104 pertaining to operations of the engine, at step S5 the SF controller 8 obtains data pertaining to the state of a vehicle on which the engine is mounted from a communication bus of the vehicle such as discussed above, and at step S6 the SF controller 8 obtains data pertaining to topology from a GPS system and/or a navigation system of the vehicle.

At step S7 the SF controller performs secondary fuel injection control, which will be discussed in greater detail relative to steps S20-S29 of FIG. 4. The closed loop secondary fuel injection control of steps S7 and S20-S29 may occur every few milliseconds.

At step S8 the SF controller checks the responses of the engine and any sub-controllers to the fuel injection control of step S7. Such sub controllers may, for example, control PTOs drawing power from the engine. At step S9, if the responses checked in S8 are all proper control will be passed through to step S10 where the data is written to a non volatile memory such as RAM of the controller 8 and/or to the communication bus of the vehicle, while if the responses checked in S8 are not all proper control will be returned to step S2.

If the system 1 is not functioning normally, at steps S11, S12 the fault is reviewed and assigned a type or category of the fault, which may generally include a communication type faults, hardware type faults, and software type faults. If the fault is a communication type fault control passes from step S12 to step S13 where the communication is again retried one or more times, as tracked by a counter, and if the communication continues to default on the retry/retries, it is determined whether the default is caused by a problem with the communication bus or simply based on bad data which, for example, could come from the SF controller 8, the main engine controller 104, or some other controller. If the communication fault is caused by a problem with the communication bus, control returns to step S4. If the fault is a communication type fault caused by bad data, control passes to step S15 where the system may begin shut down. A counter is also associated with step S15, and after a number faults occur, shutdown proceeds and control moves to steps S16 and S17 where the fault is stored and written to memory, and then to step S18 where the system is disabled until the next key cycle at step S1.

If the fault is a software or hardware type fault control passes from step S12 to step S14 and then to step S15 where, again, the system begins shut down, and after step S15 control passes to steps S16 and S17 where the fault is stored and written to memory, and then to step S18 where the system is disabled until the next key cycle at step S1.

Figure 4:
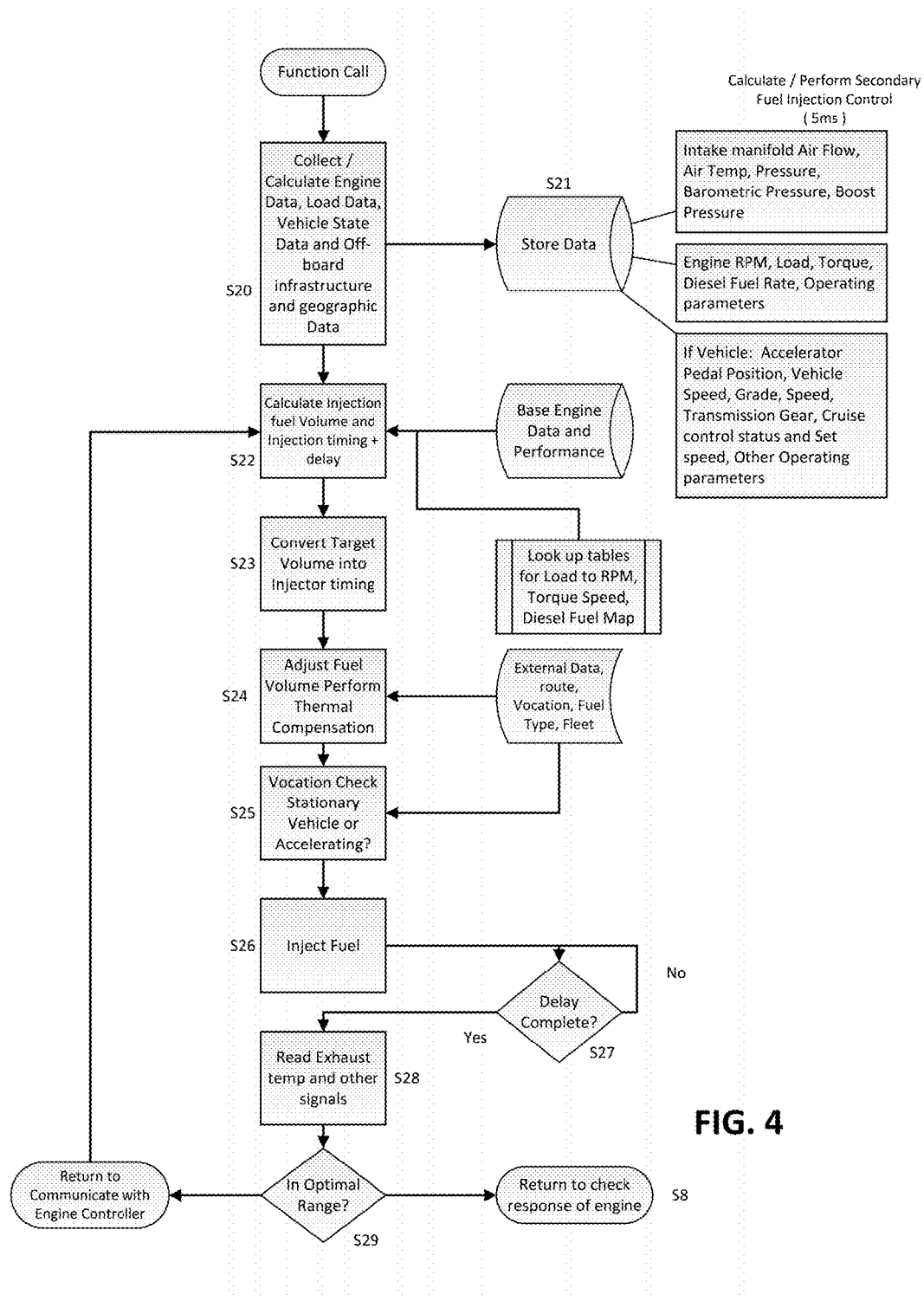
FIG. 4 is a flow chart showing the specific control for injection of the secondary fuel as part of the overall system.

Referring now to FIG. 4 which shows specific control of the secondary fuel injection. At step S20 the SF controller 8 collects and determines various data pertaining to: the air intake system 102, including intake manifold air flow rate, intake air temperature and pressure, boost pressure (if any), and barometric pressure; engine operations including RPM, load, torque output, other operating parameters, and diesel fuel injection rate; and a vehicle and/or other machine associated with the engine, including accelerator position, vehicle speed, topology grade, transmission gear, cruise control status and set speed, and other operating parameters. At step S21 the collected data is stored and/or written to a communication bus. At step S22 the SF controller 8 calculates an amount of secondary fuel to be injected into the air intake system based on the collected data and with reference to base maps for the engine which have been previously stored in the memory of the controller, as well as stored maps pertaining to an amount of secondary fuel to be injected v. the amount of diesel fuel being injected, engine load v. RPM, engine speed v. torque output, engine speed v. power output, etc.

At step S23 the SF controller 8 converts the injection amount (volume) of secondary fuel calculated in step S22 to PWM timing for the injector(s) 4. Then at steps S24, S25 the PWM timing determined in step S23 is adjusted based on the various factors discovered by the present inventor as discussed above, if necessary, e.g., based on thermal compensation relating to the ambient temperature using a compensation map storing predetermined correction coefficients, based on fuel type, based on travel route, engine use/vocation, etc. As discussed above, this may involve comparison of vehicle traveling velocity relative to engine speed/RPM, use of predetermine algorithms, acquiring a predetermined correction factor(s) from look up table(s) stored in the memory of the SF controller 8, etc.

After the PWM timing has been adjusted, if necessary, at steps S24, S245 the SF controller 8 appropriate controls the pump 6 for injecting the secondary fuel into the engine's air intake system 102 via injector(s) 4 at step S26. After an appropriate delay at step S27, which may involve use of another counter, at step S28 the SF controller 8 obtains the exhaust gas temperature, and also obtains other relevant data pertaining to the engine's operating conditions, including particulate emissions (smoke), NOx, etc. from the main engine controller 104 and/or the vehicle's communication bus.

Figure 5:
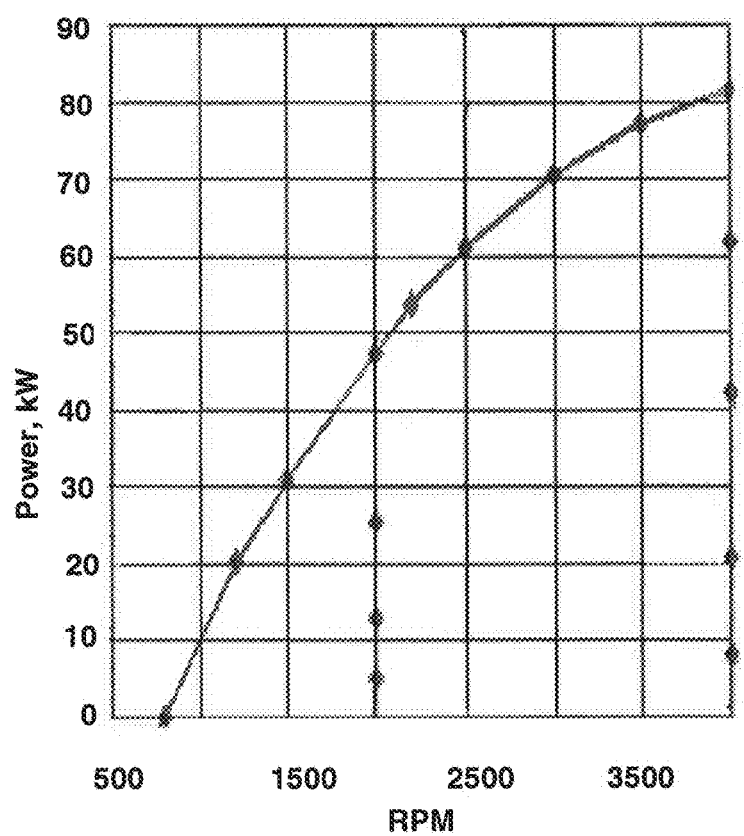
FIG. 5 is an engine model power curve comparing engine RPM to power output (kW).
Figure 6:
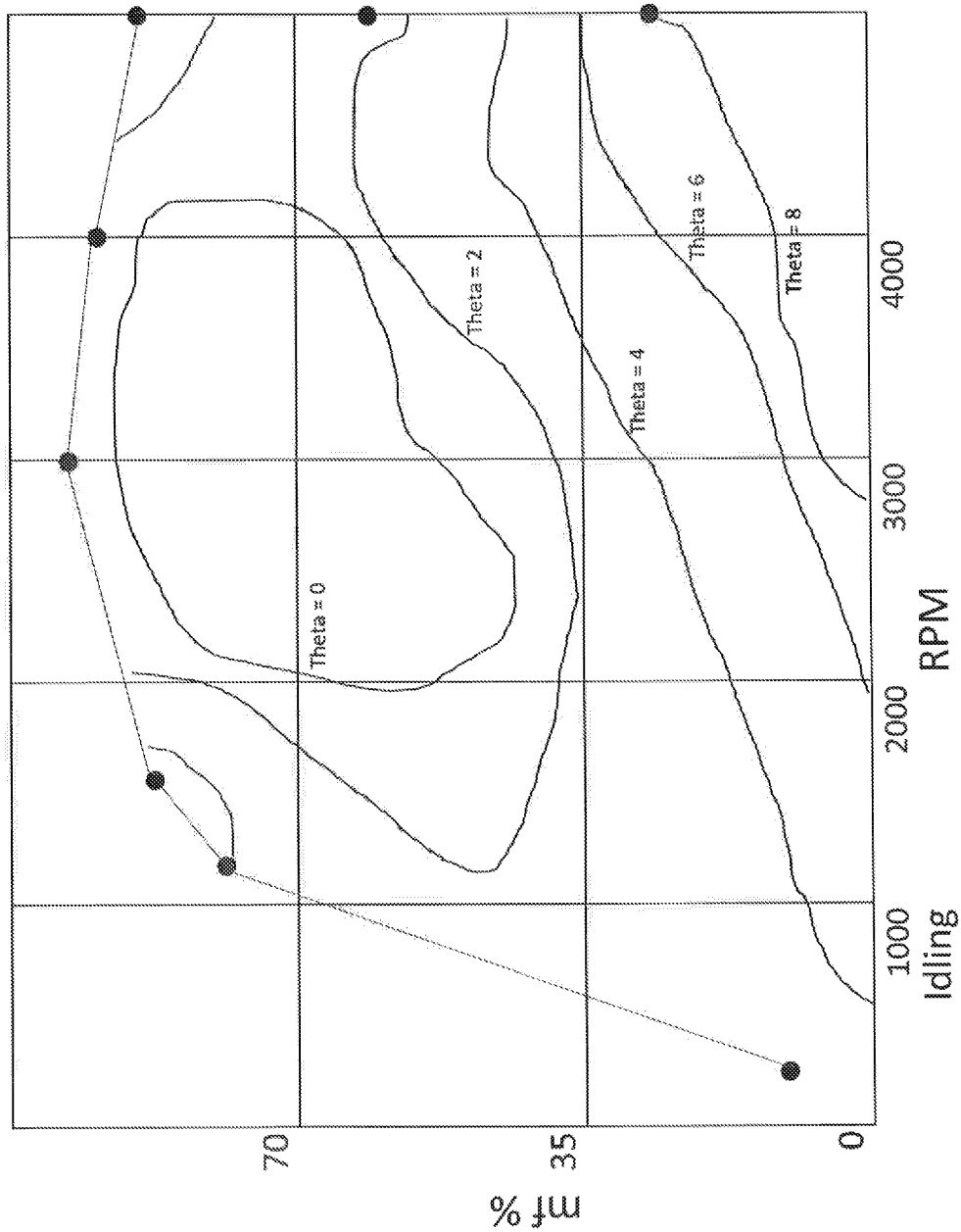
FIG. 6 is another chart reflecting engine performance which compares mass air flow % v. Engine RPM, and which includes a window (enclosed area for Theta=0) beneath the main curve indicating optimum conditions for another variable relating to mass air flow % and engine RPM.

At step S29 the SF controller determines if the injection amount of the secondary fuel is in an optimum range for the engine. It may do so by comparing the collected data to model performance curves for the engine which have been predetermined and stored in the memory of the SF controller 8, such as those in FIGS. 5, 6. FIG. 5 is an engine model power curve comparing engine RPM to power output (kW), while FIG. 6 is a chart reflecting engine performance which compares mass air flow % v. Engine RPM, and includes a window (enclosed area for Theta=0) beneath the main curve indicating optimum conditions for another variable relating to mass air flow % and engine RPM, such as the pulse width of PWM signals that drive the pump 6. If it is determined that the engine's performance falls within the appropriate optimum range(s) at step S29, then the control continues to step S8 in FIG. 3, whereas if it is determined that the engine's performance does not fall within the appropriate optimum range(s) at step S29, control returns to step S22 as feedback.

Advantages of Invention

With the system and method according to the exemplary embodiments of the present invention as discussed above, a diesel engine can reliably achieve a significant increase in power/torque output per unit of fuel based on more complete combustion of the diesel fuel and oxygen-containing secondary fuel(s) in the combustion chambers (cylinders) of the engine, and can reliably do so over a very wide range of engine operating conditions because the system and method are based on several critical discoveries/findings of the inventor. For example, a diesel engine burning diesel fuel only may achieve about 70% combustion of the fuel in the engine's cylinders, whereas with the system/method of the present invention the combustion rate of the combined fuel mixture may be increased to 80-85%, which corresponds to a 20-30% increase in power/torque output per unit of fuel. In direct correlation to the increased combustion rate, the system and method of the present invention also achieves significant reductions in undesired emissions, e.g., in association with producing repeatable 20%-30% power gains, the present invention achieves emission reductions of CO and NOx of up to 80% in diesel engines in comparison to when the engines use only diesel fuel.

Further, the system and method will typically inject the secondary fuel at an appropriate level within a range of approximately 1%-20% volume based on 100% volume of diesel fuel being injected during essentially all operating states of the engine except the warm up state after the engine is initially started, whereby improvements in fuel consumption and emissions reduction are desirably maximized relative to overall engine use.

Still further, because the present invention is able to reliably delay combustion emission so as to achieve optimum crank angle timing, such as 1°-5° before top dead center (TDC) and thereby eliminate or greatly reduce engine knocking, this reduces wear on engine components such as the wrist pin bearing and crank shaft bearing, and increases the useful life of the engine.

Although certain illustrative embodiments and applications have been described above, the present invention is not limited in its application to the details of construction and to the dispositions of the components set forth in the foregoing description or illustrated in the appended drawings in association with the present illustrative embodiments and applications of the invention. The present invention is capable of other embodiments and applications, and of being practiced and carried out in various ways. In addition, it is to be understood that the phraseology and terminology employed herein are for the purposes of illustration and example, and should not be regarded as limiting.

As such, those skilled in the art will appreciate that the concepts, upon which this disclosure is based, may readily be utilized as a basis for the designing of other structures, methods and systems for carrying out the several purposes of the present invention. It is important, therefore, that the claims be regarded as including such equivalent constructions.

What is claimed is:

1. A secondary fueling system for a diesel internal combustion engine having a system for directly injecting diesel fuel into cylinders of the engine, an air intake system through which air is drawn into the engine cylinders, and a main engine controller, the secondary fueling system comprising:
   an injector which injects an oxygen-containing secondary fuel into the air intake system; a pump which pumps the secondary fuel to the injector; a sensor which senses pressure in the air intake system; and
   a programmed secondary fuel controller which receives output signals from the sensor and pump, receives operator inputs for the engine, and receives data signals pertaining to operation of the engine from the main engine controller, determines an injection amount of the secondary fuel based thereon, and controls the pump based on the determined injection amount, wherein
   a position of the injector in the engine's air intake system is distant from the engine's intake valves and is based on the engine's displacement so as to assure that the secondary fuel is substantially, completely vaporized and homogenously mixed with other gasses in the air intake system by the time the secondary fuel is drawn into the engine cylinders,
   the secondary fuel controller is programmed to perform calculations which pertain to compression ignition of the diesel fuel and secondary fuel in the engine cylinders and which run independently of calculations performed by the main controller, and
   the secondary fuel controller is programmed to calculate a target amount of the secondary fuel to be injected into the air intake system so as to achieve a desired compression ignition point of the fuel mixture in the engine cylinders which will result in a desired power output or torque output of the engine.

2. The secondary fueling system according to claim 1, wherein the position of the injector is such that the volume of air in the engine's air intake system between the injector and the engine's intake valves is approximately equal to one quarter of the engine's displacement.

3. The secondary fueling system according to claim 1, wherein the position of the injector is determined based on the following equations (1), (2)

$$\tau = 4.3 \times 10^{-3} \times P \times 10^{-a} \times \varphi \times 10^{-b} \times \exp^{c/T} \quad (1),$$

in which $\tau$ is an amount of delay in compression combustion of the diesel fuel in one of the engine cylinders that is caused by the secondary fuel, $\varphi$ is the mass of the actual amount of air drawn into the one engine cylinder along with the secondary fuel, and a, b, c are kinematic time constants, $$-\rho(d xi/dt) = \Sigma J = 1 \text{ to } 0 \ (\Delta P\alpha ij)(\Delta PRj) \quad (2)$$

in which $\rho$ is piston displacement for the engine cylinder, $\theta$ is crank angle for the piston, i, j are counters, $\Delta P\alpha$ is the pressure change in the cylinder caused by combustion of the secondary fuel, and $\Delta PR$ is the pressure change in the cylinder caused by combustion of the diesel fuel.

4. The secondary fueling system according to claim 1, wherein the secondary fuel controller is programmed to determine the injection amount of secondary fuel according to a model-following closed loop operation substantially independent of engine control being performed by the main engine controller.

5. The secondary fueling system according to claim 1, wherein the secondary fuel controller controls the pump via pulse width modulation (PWM) control and such that a constant pressure differential is maintained across the injector.

6. The secondary fueling system according to claim 4, wherein the secondary fuel controller also receives data signals from an auxiliary controller pertaining to operations of a machine which is powered by the engine and determines the injection amount of the secondary fuel also based thereon, and the model-following closed loop operation of the controller is also substantially independent of controls being performed by the auxiliary controller.

7. The secondary fueling system according to claim 1, wherein the secondary fuel controller also receives data signals from an auxiliary controller pertaining to operations of a machine which is powered by the engine and determines the injection amount of the secondary fuel also based thereon.

8. The secondary fueling system according to claim 1, wherein the secondary fuel controller is programmed to control the pump in both a torque control mode in which the engine achieves a desired torque output using a reduced amount of diesel fuel and a power control mode in which the engine achieves a greater power output than the engine could achieve using only diesel fuel, but not simultaneously.

9. The secondary fueling system according to claim 8, wherein the secondary fuel controller selectively shifts between the torque control mode and the power control mode based on operator inputs for the engine, and data signals pertaining to operation of the engine and pertaining to operations of a vehicle or other machine to which the engine provides power.

10. The secondary fueling system according to claim 1, wherein the secondary fuel controller modifies the determined injection amount of the secondary fuel based on at least one of ambient temperature and grade of the diesel fuel being injected into the engine cylinders.

11. The secondary fueling system according to claim 1, wherein the engine is used as the power plant of a vehicle, the secondary fuel controller also receives input signals relating to a region in which the vehicle is traveling and the topology of such region, and the secondary fuel controller modifies the determined injection amount of the secondary fuel based thereon.

* * * * *